(12) United States Patent
Ganzel

(10) Patent No.: US 12,145,563 B2
(45) Date of Patent: Nov. 19, 2024

(54) APPARATUS AND METHOD FOR A HYDRAULIC BRAKE SYSTEM INCLUDING MANUAL PUSH-THROUGH

(71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 359 days.

(21) Appl. No.: 17/544,996

(22) Filed: Dec. 8, 2021

(65) Prior Publication Data

US 2023/0174032 A1 Jun. 8, 2023

(51) Int. Cl.
*B60T 8/40* (2006.01)
*B60T 7/04* (2006.01)
(Continued)

(52) U.S. Cl.
CPC ............ *B60T 8/4081* (2013.01); *B60T 7/042* (2013.01); *B60T 8/17* (2013.01); *B60T 8/326* (2013.01);
(Continued)

(58) Field of Classification Search
CPC ...... B60T 13/58; B60T 13/745; B60T 15/028; B60T 2220/04; B60T 2270/402;
(Continued)

(56) References Cited

U.S. PATENT DOCUMENTS

2016/0016571 A1* 1/2016 Ganzel .................... B60T 7/042
  303/66
2016/0229383 A1* 8/2016 Leiber .................... B60T 13/686
(Continued)

FOREIGN PATENT DOCUMENTS

CN 105228872 A * 1/2016 ............ B60T 13/166
DE 102011122776 A1 1/2013
(Continued)

OTHER PUBLICATIONS

German Search Report referencing Application No. 102022212929.6 with a mailing date of Feb. 8, 2023, pp. 1-12.

*Primary Examiner* — Vishal R Sahni
(74) *Attorney, Agent, or Firm* — Kristin L. Murphy

(57) ABSTRACT

A brake system for hydraulically actuating a pair of front wheel brakes and a pair of rear wheel brakes includes master cylinder fluidly connected to a reservoir and operable to provide a brake signal responsive to actuation of a brake pedal connected thereto. The master cylinder is selectively operable in a manual push-through mode. First and second power transmission units are in fluid communication with the reservoir and selected front and rear wheel brakes. An electronic control unit selectively controls at least one of the first and second power transmission units. First and second two-position three-way valves are each hydraulically connected with a respective power transmission unit, the master cylinder, and a respective front wheel brake. The first and second two-position three-way valves are configured to place the master cylinder in push-through fluid-supplying connection with at least a corresponding one of the pair of front wheel brakes.

17 Claims, 1 Drawing Sheet

(51) Int. Cl.
   *B60T 8/17*   (2006.01)
   *B60T 8/32*   (2006.01)
   *B60T 8/88*   (2006.01)
   *B60T 13/16*  (2006.01)
   *B60T 13/58*  (2006.01)
   *B60T 13/74*  (2006.01)
   *B60T 15/02*  (2006.01)

(52) U.S. Cl.
   CPC ............ *B60T 8/885* (2013.01); *B60T 13/161* (2013.01); *B60T 13/58* (2013.01); *B60T 13/745* (2013.01); *B60T 15/028* (2013.01); B60T 2220/04 (2013.01); B60T 2270/402 (2013.01); B60T 2270/403 (2013.01); B60T 2270/404 (2013.01); B60T 2270/413 (2013.01); B60T 2270/82 (2013.01); B60Y 2400/81 (2013.01)

(58) Field of Classification Search
   CPC ......... B60T 2270/404; B60T 2270/413; B60T 2270/82; B60Y 2400/81
   See application file for complete search history.

(56) References Cited

U.S. PATENT DOCUMENTS

| | | | | |
|---|---|---|---|---|
| 2019/0023246 | A1* | 1/2019 | Wagner | B60T 13/745 |
| 2019/0248348 | A1* | 8/2019 | Ganzel | B60T 13/745 |
| 2019/0322261 | A1* | 10/2019 | Hienz | B60T 13/686 |
| 2020/0307538 | A1* | 10/2020 | Ganzel | B60T 8/4081 |
| 2021/0053540 | A1* | 2/2021 | Besier | B60T 13/58 |
| 2022/0274572 | A1* | 9/2022 | Ganzel | B60T 13/745 |
| 2023/0001908 | A1* | 1/2023 | Einig | B60T 13/745 |
| 2023/0048447 | A1* | 2/2023 | Ganzel | B60T 17/22 |
| 2023/0141694 | A1* | 5/2023 | Ahn | B60T 13/662 303/6.01 |
| 2023/0174032 | A1* | 6/2023 | Ganzel | B60T 13/745 303/20 |

FOREIGN PATENT DOCUMENTS

| | | | | |
|---|---|---|---|---|
| DE | 102013217954 | A1 | 3/2015 | |
| DE | 102014225587 | A1 | 6/2016 | |
| DE | 102016203563 | A1 | 9/2017 | |
| DE | 102018208223 | A1 | 11/2019 | |
| DE | 112018001057 | T5 * | 11/2019 | .............. B60T 1/065 |
| DE | 102018133189 | A1 | 6/2020 | |
| DE | 102018133218 | A1 | 6/2020 | |
| DE | 112018006744 | T5 | 9/2020 | |
| DE | 102019211199 | A1 * | 1/2021 | |
| DE | 102019214792 | A1 | 4/2021 | |
| DE | 112020002652 | T5 * | 3/2022 | ............ B60T 13/142 |
| DE | 102022201760 | A1 * | 9/2022 | ............ B60T 11/165 |
| WO | WO-2019195542 | A1 * | 10/2019 | .............. B60T 11/20 |

* cited by examiner

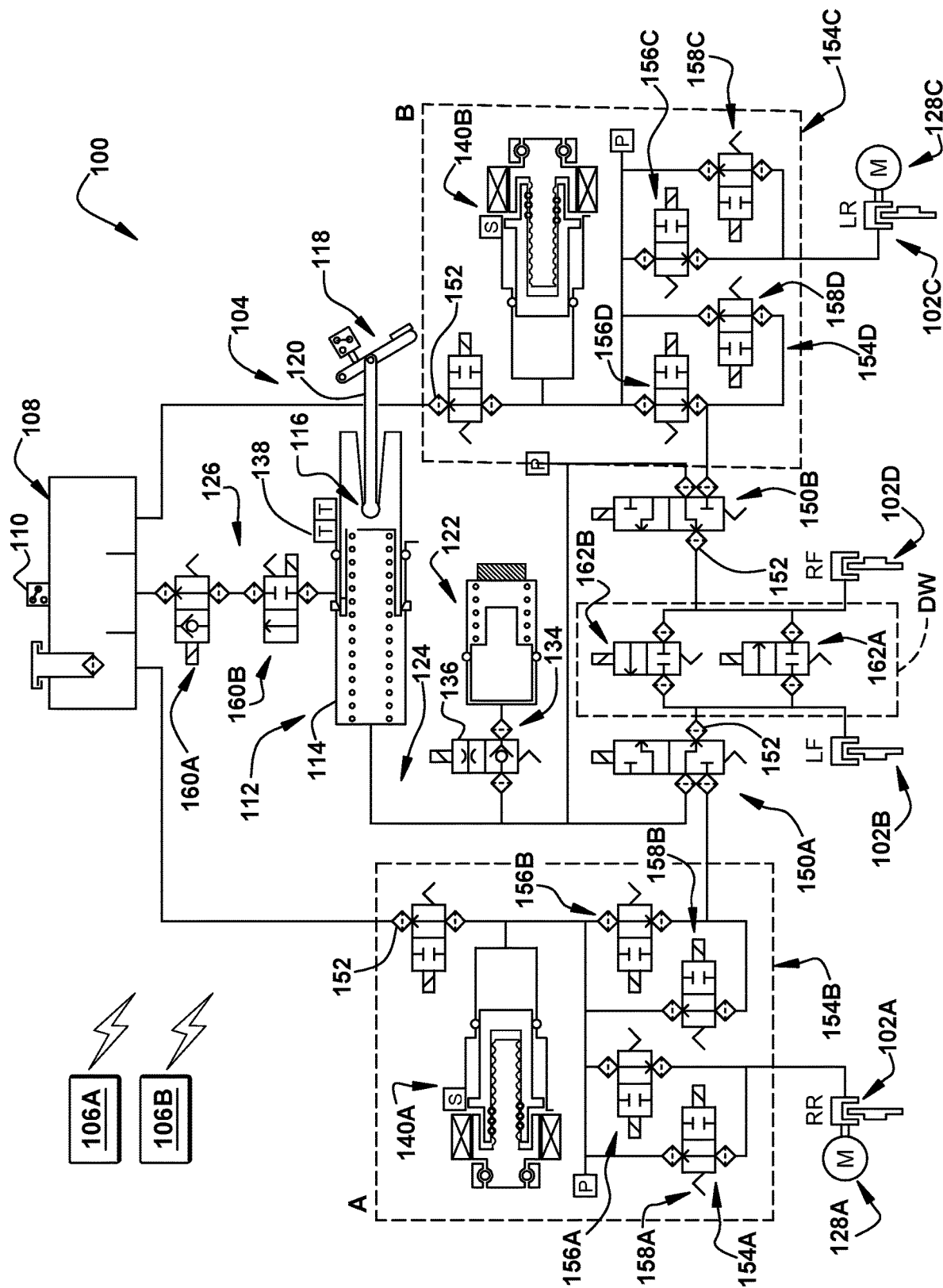

APPARATUS AND METHOD FOR A HYDRAULIC BRAKE SYSTEM INCLUDING MANUAL PUSH-THROUGH

TECHNICAL FIELD

This disclosure relates to an apparatus and method for control of a hydraulic brake system and, more particularly, to a method and apparatus for hydraulically actuating a pair of front wheel brakes and a pair of rear wheel brakes, the system having normal non-failure and backup braking modes.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a brake system for hydraulically actuating a pair of front wheel brakes and a pair of rear wheel brakes is disclosed. The system has normal non-failure, backup braking, and manual push-through modes. The system includes a reservoir and a master cylinder fluidly connected to the reservoir and operable to provide a brake signal responsive to actuation of a brake pedal connected thereto. The master cylinder is selectively operable during the manual push-through mode by actuation of the brake pedal to generate brake actuating pressure at an output for hydraulically actuating at least one brake of the pair of front wheel brakes. A first power transmission unit is in fluid communication with the reservoir, a selected brake of the pair of rear wheel brakes, and a selected brake of the pair of front wheel brakes, The first power transmission unit is configured for selectively providing pressurized hydraulic fluid for actuating the selected brake of the pair of front wheel brakes and the selected brake of the pair of rear wheel brakes in a non-failure normal braking mode. A second power transmission unit is in fluid communication with the reservoir, an other brake of the pair of rear wheel brakes, and an other brake of the pair of front wheel brakes. The second power transmission unit is configured for selectively providing pressurized hydraulic fluid for actuating the other brake of the pair of rear wheel brakes and the other brake of the pair of rear wheel brakes in a non-failure normal braking mode. A first electronic control unit selectively controls at least one of the first and second power transmission units. First and second two-position three-way valves are each hydraulically connected with a respective one of the first and second power transmission units, the master cylinder, and a respective one of the pair of front wheel brakes. The first and second two-position three-way valves are configured to place the master cylinder in push-through fluid-supplying connection with at least a corresponding one of the pair of front wheel brakes when the brake system is in the manual push-through mode.

BRIEF DESCRIPTION OF THE DRAWING

For a better understanding, reference may be made to the accompanying drawing, in which:

FIG. 1 is a schematic hydraulic diagram of a brake system according to an aspect of the present invention.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

FIG. 1 depicts a brake system 100 for selectively hydraulically actuating at least one of a pair of front wheel brakes and a pair of rear wheel brakes of a vehicle. The brake systems 100 may suitably be used on a ground vehicle, such as an automotive vehicle having four wheels with a wheel brake associated with each wheel. Furthermore, the brake systems 100 can be provided with other braking functions such as anti-lock braking (ABS) and other slip control features to effectively brake the vehicle. Components of the brake systems 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid, though will be presumed to be hydraulically operated in the below description. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the selected brake system 100 is installed. The brake system 100 has normal non-failure, backup braking, and manual push-through modes. It should be noted that features of the brake system 100 could be active in one or more of the modes—e.g., manual push-through could be available in both the normal non-failure mode and the backup braking mode, for a desired use environment.

It is contemplated that the wheel brakes 102A, 102B, 102C, and 102D could each be powered electrically and/or hydraulically—for example, at least one of the wheel brakes 102A, 102B, 102C, and 102D could be powered electrically during certain phases of operation (e.g., service/parking) and hydraulically during other phases of operation (e.g., parking/service), of the same brake system 100, in addition to the potential provision of electrically or hydraulically operated parking brakes to any of the front and/or rear wheels, as desired. To that end, and in the embodiment of FIG. 1, a brake motor 128 (two shown, as 128A and 128C) may be configured to selectively operate a chosen one of the pair of rear brakes 102A, 102C.

In the example shown in the FIGURES, the hydraulically operated wheel brake 102A may be associated with a right rear wheel of the vehicle in which the brake system 100 is installed, and the hydraulically operated wheel brake 102B may be associated with the left front wheel. The hydraulically operated wheel brake 102C may be associated with the left rear wheel, and the hydraulically operated wheel brake 102D may be associated with the right front wheel.

The brake systems 100 may include a brake pedal unit, indicated generally at 104, an electronic control unit 106, and a fluid reservoir 108. The reservoir 108 stores and holds hydraulic fluid for the brake system 100. The fluid within the reservoir 108 is preferably held at or about atmospheric pressure, but the fluid may be stored at other pressures if desired. The reservoir 108 is shown schematically as having three tanks or sections in FIG. 1, with fluid conduit lines connected to the tanks or sections. The sections can be separated by several interior walls within the reservoir 108 and are provided to prevent complete drainage of the reservoir 108 in case one of the sections is depleted due to a leakage via one of the three lines connected to the reservoir 108. Alternatively, the reservoir 108 may include multiple separate housings. The reservoir 108 may include at least one fluid level sensor 110 for detecting the fluid level of one or more of the sections of the reservoir 108.

One or more electronic control units ("ECU") 106 are provided to the brake system 100 and may include microprocessors and other electrical circuitry. The ECU 106 receives various signals, process signals, and control the operation of various electrical components of the brake system 100 in response to the received signals, in a wired and/or wireless manner. The ECU 106 can be connected to various sensors such as the reservoir fluid level sensor 110, pressure sensors, travel sensors, switches, wheel speed sensors, and steering angle sensors. The ECU 106 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 106 may be connected to the instrument cluster for collecting and supplying information related to warning indicators such as an ABS warning light, a brake fluid level warning light, and a traction control/vehicle stability control indicator light. One of ordinary skill in the art will be able to readily provide any desired number of ECUs 106, having any suitable characteristics, for a particular use environment of the present invention.

As shown schematically in FIG. 1, the brake pedal unit 104 may include a master cylinder 112 with an MC housing 114 defining a longitudinally extending bore for slidably receiving various cylindrical pistons and other components therein. Examples of such components are the spring longitudinally held within the bore and the seals facilitating relative movement between components, as shown in the FIGURE. Note that the MC housing 114 is not specifically schematically shown in the FIGURE, but instead the walls of the longitudinally extending bore are schematically illustrated. The MC housing 114 may be formed as a single unit or include two or more separately formed portions coupled together. For some use environments, the master cylinder 112 may be of a single chamber or tandem type. If tandem, it could be a simultaneous or sequential cutoff type.

An MC primary piston 116 is connected with a brake pedal 118 via a linkage arm 120. Leftward movement of the MC primary piston 116 may cause, under certain conditions, a pressure increase within the master cylinder 112.

A brake simulator 122 is in selective fluid communication with the master cylinder 112 for providing predetermined brake pedal response. As shown, the brake simulator 122 is connected to the master cylinder 112 via one or more hydraulic passages, but it is contemplated that the "selective fluid communication" could be provided via integration of the brake simulator 122 into the master cylinder 112.

More specifically, the master cylinder 112 is in fluid communication with the brake simulator 122 via a master cylinder passage 124. The MC primary piston 116 is slidably disposed in the bore of the MC housing 114. When the brake pedal unit 104 is in its rest position (the driver is not depressing the brake pedal 118), the structures of the master cylinder 112 permit fluid communication between the bore of the MC housing 114 and the reservoir 108 via a reservoir conduit 126. The brake simulator 122 is therefore in selective fluid communication with the master cylinder 112 for providing predetermined brake pedal 118 response to the driver (e.g., brake pedal "feel").

The brake simulator 122 is in fluid communication with the brake simulator passage 134, which is in fluid communication with the master cylinder 112 of the brake pedal unit 104 via simulator valve 136. One example of desired operation of the simulator valve 136 is during an initial/startup condition and/or a hydraulic push-through mode, in which the brake pedal unit 104 (e.g., the master cylinder 112 thereof) is utilized to provide a source of pressurized fluid to selected ones of the wheel brakes 102A, 102B, 102C, and 102D in a push-through manner, as described herein. The simulator valve 136 may be energized to the open position throughout an entire ignition cycle unless it is desirable to place the brake system 100 into a hydraulic push-through mode.

The brake pedal unit 104 is connected to the brake pedal 118 and is actuated by the driver of the vehicle as the driver presses on the brake pedal 118. A brake sensor or switch 138 (two shown, for redundancy) may be electrically connected to the ECU 106 to provide a brake signal indicating a depression of the brake pedal 118. That is, the master cylinder 112 is operable to provide a brake signal responsive to actuation of the brake pedal 118 connected thereto. The brake signal may be transmitted from at least one of the brake sensors 138 to the ECU 106 in any desired wired and/or wireless manner.

A first power transmission unit 140A is in fluid communication with the master cylinder 112 and the reservoir 108. The first power transmission unit 140A is configured for selectively providing pressurized hydraulic fluid for actuating a selected one of the pair of front wheel brakes 102B, 102D and a selected one of the pair of rear wheel brakes 102A, 102C in a non-failure normal braking mode, and is thus also in fluid communication with those selected wheel brakes. As shown in FIG. 1, the first power transmission unit 140A actuates the diagonal wheel brakes on the right rear 102A and left front 102B of the vehicle.

A second power transmission unit 140B is in fluid communication with the reservoir 108. The second power transmission unit 140B is configured for selectively providing pressurized hydraulic fluid for actuating the other one of the pair of front wheel brakes 102B, 102D and the other one of the pair of rear wheel brakes 102A, 102C in a non-failure normal braking mode. As shown in FIG. 1, the second power transmission unit 140B actuates the diagonal wheel brakes on the left rear 102C and right front 102D of the vehicle.

The pair of front wheel brakes 102B, 102C, as shown in FIG. 1, will have readily available manual push-through due to the presence of the master cylinder 112 in that portion of the brake system 100 circuit. Additionally, though not discussed further herein, manual push-through of the pair of rear wheel brakes 102A, 102C could be provided in some use environments of the brake system 100 (e.g., when the master cylinder 112 and valving arrangements are configured to do so). The electronic control unit 106 controls at least one of the first and second power transmission units 140A, 140B. It is contemplated that, for particular use environments of the brake system 100 of either configuration shown in the FIGURES, the electronic control unit 106 may be a first electronic control unit 106A which controls the first power transmission unit 140A responsive to the brake signal generated by the brake pedal unit 104, and the brake system 100 may further include a second electronic control unit 106B for controlling the second power transmission unit 140B responsive to the brake signal generated by the brake pedal unit 104.

When brake motors 128A, 128C are provided to the pair of rear wheel brakes 102A, 102C and both first and second electronic control units 106A, 106B are present, the brake motor 128A, 128C for each electro-hydraulic brake 102A, 102C may be controlled by the one of the first and second electronic control units 106A, 106B which controls the contralateral power transmission unit 140. That is, the brake motor 128A, 128C for a chosen brake is controlled by the first or second electronic control unit 106A, 106B, which controls the one of the first and second power transmission units 140A, 140B which does not selectively provide pressurized hydraulic fluid for the chosen brake. Accordingly, some redundancy can be provided in the system, such that if one electronic control unit 106 fails (thus removing control of the corresponding power transmission unit 140), then the brake motor 128 is still available for that wheel brake 102 because it is controlled by the other electronic control unit 106.

After a brake apply, fluid from the hydraulically operated wheel brakes 102A, 102B, 102C, and 102D may be returned to the respective power transmission unit 140A, 140B and/or diverted to the reservoir 108. As shown in FIG. 1, at least one power transmission unit 140 of the depicted brake system 100 may include a single acting plunger unit configured to selectively generate the pressurized hydraulic fluid for actuating at least one corresponding wheel brake 102. Other suitable types of power transmission units 140 for use in the brake systems 100 shown include, but are not limited to, but are not limited to, ball screw driven or rack and pinion driven dual acting plungers, rack and pinion driven single acting plungers, and/or the power transmission unit shown and described in copending U.S. patent application Ser. No. 17/400,326, filed 12 Aug. 2021 and titled "Power Transmission Unit and Brake Systems Using Same", hereafter referenced as "the '326 application", which is incorporated herein by reference in its entirety.

The brake pedal unit 104 may be used as a backup source of pressurized fluid to essentially replace the normally supplied source of pressurized fluid from the first and/or second power transmission unit 140A, 140B under certain failed conditions of the brake system 100, and/or upon initial startup of the brake system 100. This situation is referred to as a manual push-through mode, or a "manual apply" and may be accomplished during the backup braking mode and/or during the normal non-failure mode. That is, the master cylinder 112 is selectively operable during a manual push-through mode by actuation of the brake pedal 118 to generate brake actuating pressure at at least one output (here, schematically shown as a single master cylinder passage 124) for hydraulically actuating at least one brake of the pair of front wheel brakes 102B, 102D and/or the pair of rear wheel brakes 102A, 102C.

In such a push-through mode, the brake pedal unit 104 can supply pressurized fluid to the master cylinder passage 124, which is then routed to the appropriate hydraulically operated wheel brakes 102A, 102B, 102C, and 102D as desired. In the brake system of FIG. 1, this push-through feature is provided to the pair of front wheel brakes 102B, 102D. This flow is pushed through, largely under mechanical pressure upon the brake pedal 118 from the driver's foot, from the master cylinder 112.

First and second two-position three-way valves 150A and 150B, respectively, are provided to the brake system 100 as shown in FIG. 1. Each of the first and second three-way valves 150A and 150B is hydraulically connected with the master cylinder 112, a respective first or second power transmission unit 140A or 140B, and at least a selected wheel brake of each of the pairs of the front and rear wheel brakes 102, such as a respective one of the pair of front wheel brakes 102B, 102D. For example, and as shown in FIG. 1, the first three-way valve 150A is in fluid communication with the left front wheel brake 102B, and the second three-way valve 150B is in fluid communication with the right front wheel brake 102D. The first and second three-way valves 150A and 150B each are configured to selectively switch the respective hydraulically operated brake (102B and 102D, respectively, as shown in FIG. 1) to receive fluid from a selected one of the master cylinder 112, in the backup braking mode or otherwise during manual push-through, and a respective first or second power transmission unit 140A, 140B, in the normal non-failure braking mode. Through use of the first and second three-way valves 150A and 150B, hydraulic fluid can be routed to the wheel brakes 102 in a desired manner (from either the master cylinder 112 or the respective first/second power transmission unit 140A/140B) to assist with boosted braking control and provide desired response times and efficient pressure flow to the respective wheel brakes 102 associated with each three-way valve. That is, the first and second two-position three-way valves 150A, 150B are configured to place the master cylinder 112 in push-through fluid-supplying connection with at least a corresponding one of the pair of front wheel brakes (and in some use environments, with both of the front wheel brakes 102B, 102D) when the brake system is in the manual push-through mode.

It is contemplated that one normally-closed valve and one normally-open valve could be used instead of the first and/or second three-way valves 150A and 150B, in particular use environments of the brake system 100. It should be appreciated that, when power is lost to the first and/or second three-way valves 150A and 150B, they may be configured, in some situations, to "fail" in such a position to facilitate manual push-through from the master cylinder 112, under the presumption that power might also be lost to the corresponding first or second power transmission unit 140A or 140B.

The electronic control unit 106 (when a single one is present) is configured to control the first and second power transmission unit 140A, 140B, the first three-way valve 150A, and the second three-way valve 150B responsive to the brake signal. It is also contemplated that, when two electronic control units 106 are provided to the brake system 100, a first electronic control unit 106A may be provided for controlling a selected one of the first and second power transmission units 140A, 140B, and a selected one of the first and second three-way valves 150A, 150B (e.g., in a normal non-failure braking mode), and a second electronic control unit 106B may be provided for controlling the other one of the first and second power transmission units 140A, 140B, and the other one of the first and second three-way valves 150A, 150B (e.g., in a normal non-failure braking mode). That is, the two-position three-way valve 150 for a chosen brake is controlled by the first or second electronic control unit 106A, 106B, which controls the one of the first and second power transmission units 140A, 140B which selectively provides pressurized hydraulic fluid for the chosen brake. Accordingly, some redundancy can be provided in the system, such that if one electronic control unit 106 fails (thus removing control of the corresponding power transmission unit 140), then the two-position three-way valve 150 is still available to facilitate a manual push-through mode due to the manner in which the two-position three-way valve 150 is configured to fail when de-energized. One of ordinary skill in the art can readily provide a suitable system using first and second electronic control units 106 to provide desired redundancy for a particular use environment of the brake systems 100 of FIG. 1.

At least one filter 152 may be provided in any desired position(s) within the brake systems 100. For example, and as shown in the FIGURE, many of the components of the brake system 100 may include a filter 152 positioned upstream and/or downstream thereof, along a hydraulic line. While example filters 152 are labeled in the FIGURE, one of ordinary skill in the art will be able to recognize multiple other diamond-shaped filter symbols in the depicted brake systems 100, left unlabeled for clarity of depiction.

Multiplex valve arrangements 154 may be interposed hydraulically between the first or second (when present) power transmission unit 140A, 140B and each of the wheel brakes 102 associated therewith. It is contemplated that multiplex arrangements 154 would be provided for both of the pair of front wheel brakes 102B, 102D and/or both the pair of rear wheel brakes 102A, 102C for a vehicle, to keep the multiplex ability symmetrical across the left and right sides of that vehicle.

The multiplex arrangements 154 are each controlled by one of the first and second electronic control units 106A, 106B. Each of the multiplex arrangements 154 includes first and second iso-type valves 156 and 158, respectively. The first and second iso-type valves 156 and 158 could be substantially similar in configuration to each other, or could include some differences. One of ordinary skill in the art will readily be able to provide suitable first and second iso-type valves 156 and 158 for a desired use environment of the present invention.

Here, for clarity in FIG. 1, the first and second iso-type valves 156 and 158 are appended with the letters "A", "B", "C", or "D", referencing a respective front wheel brake 102B and 102D or rear wheel brake 102A and 102C, with which the so-labeled valves are respectively associated. The first and second iso-type valves 156 and 158 for selected front and rear wheel brakes 102A/102B or 102C/102D can be actuated by the first power transmission unit 140A, and the first and second iso-type valves 156 and 158 for the other front and rear wheel brakes 102C/102D or 102A/102B can be actuated by the second power transmission unit 140B, as shown in FIG. 1.

The multiplex control facilitated by the multiplex valve arrangements 154 selectively provides, for example, slip control or traction compensation to at least one of the pair of front wheel brakes 102B and 102D and/or the pair of rear wheel brakes 102A and 102C, corresponding to a selected arrangement of first and second iso-type valves 156 and 158. In this manner, the fluid pressures at each of the front wheel brakes 102B and 102D and the rear wheel brakes 102A and 102C can be controlled independently from one another even though the brake system 100—or at least or the corresponding first or second brake pressure circuit—may include a single source of pressure (e.g., first or second power transmission unit 140A or 140B). The multiplex valve arrangement 154, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

In the configuration depicted in FIG. 1, the multiplex control valve arrangements 154A, 154B and the first power transmission unit 140A could be co-located (as noted by the dashed line "A") in a modular or unitary component such as, but not limited to, that disclosed in the '326 application. It is contemplated that the components located inside dashed line "A" in FIG. 1 may be spaced apart in the vehicle, hydraulically if not also mechanically, from components outside that line (i.e., by being located remote from one another within the brake system 100, and at least apart from a common housing or block).

It is likewise contemplated that the multiplex control valve arrangements 154C, 154D and the second power transmission unit 140B could be co-located (as noted by the dashed line "B") in a modular or unitary component such as, but not limited to, that disclosed in the '326 application. It is contemplated that the components located inside dashed line "B" in FIG. 1 may be spaced apart in the vehicle, hydraulically if not also mechanically, from components outside that line (i.e., by being located remote from one another within the brake system 100, and at least apart from a common housing or block).

It is further contemplated that one or both of the modular or unitary assemblies denoted by dashed lines "A" or "B" in FIG. 1 could be co-located with one or more of the components which are outside those dashed lines, as desired for a particular use environment. One of ordinary skill in the art can package the components of the brake system 100 as desired for redundancy, ease of manufacture, spatial considerations, cost considerations, and/or any other reason.

At least one shutoff valve 160 may be interposed hydraulically between the reservoir 108 and the master cylinder 112, such as by being located along the reservoir passage 126. When present, the shutoff valve(s) 160 are configured to selectively prevent hydraulic fluid transfer to the reservoir 108 when the brake system 100 is in the backup braking mode when one of the power transmission units 140A, 140B fails.

With reference to FIG. 1, first and second shutoff valves 160A and 160B are shown interposed hydraulically between the reservoir 108 and the master cylinder 112. For redundancy, the first shutoff valve 160A may be controlled by the first electronic control unit 106A, and the second shutoff valve 160B may be controlled by the second electronic control unit 106B. As depicted in FIG. 1, the second shutoff valve 160B may be a normally closed valve including a solenoid and a spring on a same side of the valve 160B, such that the spring alone can resist opening of the valve under a predetermined low pressure from the master cylinder 112 (e.g., in the range of 0.2-0.5 bar, for some use environments), but the solenoid and spring together collectively resist opening of the valve 160B under a predetermined high master cylinder 112 pressure value (e.g., in the range of at least 180-220 bar, for some use environments).

The shutoff valve(s) 160, when present, can help prevent pressurized hydraulic fluid from being directed to the reservoir in the backup braking mode, such that each of the first and second power transmission units 140A, 140B is capable of selectively applying three wheel brakes 102 (i.e., both of the pair of front wheel brakes 102B, 102D and a corresponding one of the pair of rear wheel brakes 102A, 102C), particularly in situations where the other of the first and second power transmission units 140A, 140B is unavailable.

The shutoff valve(s) 160 may also used as simulator test valves during system self-diagnostic testing, if desired. One of the shutoff valves 160 is normally closed (taking relatively low pressure to open if de-energized). This may help prevent the reservoir 108 from undesirable fluid loss if the master cylinder 112 circuit incurs an external leak. The wheel brakes 102 are vented through the respective power transmission unit 140 circuits A or B during normal boosted braking.

First and second two-way valves 162A, 162B are interposed hydraulically between the pair of front brakes 102B, 102D and the first and second two-position three-way valves 150A, 150B. When present, the first and second two-way valves 162A, 162B are operable, when the brake system 100 is in the backup braking mode, to provide fluid from a chosen one of the first and second power transmission units 140A and 140B to both of the pair of front brakes 102B, 102D. Through use of the first and second two-way valves 162A, 162B, therefore, a single one of the first and second power transmission units 140A and 140B can provide hydraulic power to both of the front wheel brakes 102B, 102D, to maintain front braking symmetry even if one of the power transmission units 140 is offline for some reason (e.g., failure of the associated electronic control unit 106). As a result, the pair of front wheel brakes 102B, 102D each have two differently-controlled power sources, much like the electric-hydraulic power options available for each of the pair of rear wheel brakes 102A, 102C. As seen above with respect to other redundant features of the brake system 100, the first two-way valve 162A may be controlled by the first electronic control unit 106A, and the second two-way valve 162B may be controlled by the second electronic control unit 106B.

It is contemplated that, instead of the first and second two-way valves 162A and 162B, one dual-wound two-way valve may be interposed hydraulically between the pair of front brakes 102B, 102D and the first and second two-position three-way valves 150A, 150B, as represented in FIG. 1 by dashed line "DW". In such case, the dual-wound two-way valve may be operable, when the brake system 100 is in the backup braking mode, to provide fluid from a chosen one of the first and second power transmission units 150A and 140B to both of the pair of front brakes 102B, 102D. Again for redundancy, when first and second electronic control units 106A and 106B are present in the brake system 100, a first one of the dual windings of the dual-wound two-way valve may be controlled by the first electronic control unit 106A, and a second one of the dual windings of the dual-wound two-way valve may be controlled by the second electronic control unit 106B.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the FIGURES is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or FIGURES unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the FIGURES, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the FIGURES. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for hydraulically actuating a pair of front wheel brakes and a pair of rear wheel brakes, the system having normal non-failure, backup braking, and manual push-through modes, the system comprising:
    a reservoir;
    a master cylinder fluidly connected to the reservoir and operable to provide a brake signal responsive to actuation of a brake pedal connected thereto, the master cylinder being selectively operable during the manual push-through mode by actuation of the brake pedal to generate brake actuating pressure at an output for hydraulically actuating at least one brake of the pair of front wheel brakes;
    a first power transmission unit in fluid communication with the reservoir, a selected brake of the pair of rear wheel brakes, and a selected brake of the pair of front wheel brakes, the first power transmission unit being configured for selectively providing pressurized hydraulic fluid for actuating the selected brake of the pair of front wheel brakes and the selected brake of the pair of rear wheel brakes in a non-failure normal braking mode;
    a second power transmission unit in fluid communication with the reservoir, an other brake of the pair of rear wheel brakes, and an other brake of the pair of front wheel brakes, the second power transmission unit being configured for selectively providing pressurized hydraulic fluid for actuating the other brake of the pair of rear wheel brakes and the other brake of the pair of rear wheel brakes in a non-failure normal braking mode;
    a first electronic control unit for selectively controlling at least one of the first and second power transmission units; and
    first and second two-position three-way valves, each hydraulically connected with a respective one of the first and second power transmission units, the master cylinder, and a respective one of the pair of front wheel brakes, the first and second two-position three-way valves being configured to place the master cylinder in push-through fluid-supplying connection with at least a corresponding one of the pair of front wheel brakes when the brake system is in the manual push-through mode, wherein the first and second two-position three-way valves are bypassed when the first and second power transmission units provide pressurized hydraulic fluid for actuating the respective selected brake and the other brake of the pair of rear wheel brakes in a non-failure normal braking mode.

2. The brake system of claim 1, including a brake simulator in selective fluid communication with the master cylinder for providing predetermined brake pedal response.

3. The brake system of claim 1, wherein at least one of the first and second power transmission units includes a single acting plunger unit configured to selectively generate the pressurized hydraulic fluid for actuating at least one corresponding wheel brake.

4. The brake system of claim 1, wherein the first electronic control unit controls the first power transmission unit, and the brake system includes a second electronic control unit for selectively controlling the second power transmission unit.

5. The brake system of claim 1, including a multiplex valve arrangement hydraulically interposed between each of the first and second power transmission units and the corresponding brake of the pair of front wheel brakes.

6. The brake system of claim 5, wherein the multiplex valve arrangements each include first and second iso-type valves arranged in parallel with one another.

7. The brake system of claim 1, including a multiplex valve arrangement hydraulically interposed between each of the first and second power transmission units and the corresponding brake of the pair of rear wheel brakes.

8. The brake system of claim 7, wherein the multiplex valve arrangements each include first and second iso-type valves arranged in parallel with one another.

9. The brake system of claim 1, including a brake motor configured to selectively operate a chosen one of the pair of rear brakes.

10. The brake system of claim 9, wherein the first electronic control unit controls the first power transmission unit, and the brake system includes a second electronic control unit for selectively controlling the second power transmission unit, the brake motor for the chosen brake being controlled by the one of the first and second power transmission units which controls the one of the first and second power transmission units which does not selectively provide pressurized hydraulic fluid for the chosen brake.

11. The brake system of claim 1, including a shutoff valve interposed hydraulically between the reservoir and the master cylinder, the shutoff valve being configured to selectively prevent hydraulic fluid transfer to the reservoir when the brake system is in the backup braking mode, such that each of the first and second power transmission units is configured to selectively apply both of the pair of front wheel brakes and a corresponding one of the pair of rear wheel brakes when the brake system is in the backup braking mode.

12. The brake system of claim 11, wherein the shutoff valve is a first shutoff valve, and including a second shutoff valve interposed hydraulically between the reservoir and the master cylinder and arranged in series with the first shutoff valve, the second shutoff valve being configured to selectively prevent hydraulic fluid transfer to the reservoir when the brake system is in the backup braking mode.

13. The brake system of claim 12, wherein the second shutoff valve is a normally closed valve including a solenoid and a spring on a same side of the valve such that the solenoid and spring collectively resist opening of the valve under a predetermined high master cylinder pressure value, the spring being operative alone to resist opening of the valve under a predetermined low master cylinder pressure.

14. The brake system of claim 12, wherein the first electronic control unit controls the first power transmission unit, and the brake system includes a second electronic control unit for selectively controlling the second power transmission unit, the first shutoff valve being controlled by the first electronic control unit, and the second shutoff valve being controlled by the second electronic control unit.

15. The brake system of claim 1, wherein first and second two-way valves are interposed hydraulically between the pair of front brakes and between the first and second two-position three-way valves, the first and second two-way valves being operable, when the brake system is in the backup braking mode, to a first condition to provide fluid from the first power transmission unit to both of the pair of front brakes or a second condition to provide fluid from the second power transmission unit to both of the pair of front brakes.

16. The brake system of claim 15, wherein the first electronic control unit controls the first power transmission unit, and the brake system includes a second electronic control unit for selectively controlling the second power transmission unit, the first two-way valve being controlled by the first electronic control unit, and the second two-way valve being controlled by the second electronic control unit.

17. The brake system of claim 1, wherein each of the first and second two-position three-way valves places the master cylinder in fluid communication with exactly one of the front wheel brakes in manual push-through mode.

* * * * *